(12) United States Patent
Laube et al.

(10) Patent No.: US 6,627,693 B1
(45) Date of Patent: Sep. 30, 2003

(54) ELASTOMERIC COMPOSITIONS HAVING IMPROVED APPEARANCE

(75) Inventors: Stephen G. Laube, Duluth, GA (US); Michael Curtin, Sugar Hill, GA (US)

(73) Assignee: Cabot Corporation, Boston, MA (US)

( * ) Notice: Subject to any disclaimer, the term of this patent is extended or adjusted under 35 U.S.C. 154(b) by 419 days.

(21) Appl. No.: 09/456,273

(22) Filed: Dec. 7, 1999

Related U.S. Application Data

(63) Continuation-in-part of application No. 09/207,274, filed on Dec. 8, 1998, now abandoned.

(51) Int. Cl.$^7$ ................................................ C08K 3/04
(52) U.S. Cl. ........................................ 524/495; 524/496
(58) Field of Search ................................ 524/495, 496

(56) References Cited

U.S. PATENT DOCUMENTS

| | | | |
|---|---|---|---|
| 3,622,650 A | 11/1971 | Berstein et al. .............. 260/763 |
| 3,864,305 A | 2/1975 | Jordan et al. ............ 260/42.47 |
| 3,952,087 A | 4/1976 | Antonsen et al. ........... 423/450 |
| 4,105,750 A | 8/1978 | Horn et al. .................. 423/456 |
| 4,370,308 A | 1/1983 | Williams et al. ............ 423/450 |
| 4,374,113 A | 2/1983 | Yates et al. ................. 423/445 |
| 4,550,135 A | * 10/1985 | Iwana ........................ 524/495 |
| 4,879,104 A | 11/1989 | List et al. .................... 423/450 |
| 5,093,407 A | 3/1992 | Komai et al. ............... 524/495 |
| 5,110,576 A | 5/1992 | Soeda et al. ................ 423/445 |
| 5,124,396 A | 6/1992 | Branan, Jr. et al. ......... 524/496 |
| 5,137,962 A | 8/1992 | Green ........................ 524/496 |
| 5,168,106 A | 12/1992 | Babcock et al. ............. 524/495 |
| 5,229,452 A | 7/1993 | Green et al. ................. 524/415 |
| 5,232,974 A | 8/1993 | Branan, Jr. et al. ......... 524/495 |
| 5,236,992 A | 8/1993 | Bush ........................... 524/495 |
| 5,288,788 A | 2/1994 | Shieh et al. ................. 524/495 |
| 5,352,289 A | 10/1994 | Weaver et al. .............. 106/476 |
| 5,382,621 A | 1/1995 | Laube ........................ 524/496 |
| 5,393,821 A | 2/1995 | Shieh et al. ................. 524/495 |
| 5,484,836 A | * 1/1996 | Kikuchi ...................... 524/495 |
| 5,700,845 A | 12/1997 | Chung et al. ................. 521/99 |

FOREIGN PATENT DOCUMENTS

| | | | |
|---|---|---|---|
| EP | 0 012 999 | 7/1980 | ............ C08L/9/00 |
| JP | 19900317862 | 11/1990 | |
| JP | 19910237009 | 8/1991 | |
| JP | 19920059099 | 2/1992 | |
| JP | 19920060946 | 2/1992 | |
| WO | WO 91/12202 | 8/1991 | ........... C01B/31/02 |
| WO | WO 91/13944 | 9/1991 | ............. C09C/1/48 |

OTHER PUBLICATIONS

Cabot Corporation, North American Technical Report S–136.

* cited by examiner

*Primary Examiner*—Edward J. Cain

(57) ABSTRACT

Compositions comprising an elastomer and a carbon black are disclosed, which may be used to form articles having higher gloss and/or jetness than articles formed using an industry standard carbon black such as N650. The carbon blacks may be characterized by an $I_2$No. of from about 80 to about 400 mg/g, a DBP value of from about 50 to about 175 cc/100 g, a tint value of from about 100 to about 175% ITRB, a $N_2$SA value of from about 80 to about 450 m$^2$/g, and/or a CTAB value of from about 80 to about 300 m$^2$/g. Also described are articles made from the composition, and processes for making the article.

48 Claims, 1 Drawing Sheet

ELASTOMERIC COMPOSITIONS HAVING IMPROVED APPEARANCE

This application is a continuation-in-part of prior application Ser. No. 09/207,274 filed Dec. 8, 1998 now abandoned, which is fully incorporated herein in its entirety by reference.

FIELD OF THE INVENTION

The present invention relates to elastomeric compositions having improved appearance.

More specifically, the present invention relates to elastomeric compositions comprising an elastomer and carbon black which provide the elastomeric compositions with improved visual properties, such as jetness and gloss.

BACKGROUND OF THE INVENTION

Carbon blacks are generally produced in a furnace-type reactor by pyrolyzing a hydrocarbon feedstock with hot combustion gases to produce combustion products containing particulate carbon black.

Carbon blacks are generally characterized on the basis of analytical properties including, but not limited to, surface area, surface chemistry, aggregate size, and particle size. The properties of carbon blacks are analytically determined by tests known to the art, including, for example, CTAB, DBP, and tinting strength value (Tint). Carbon blacks may also be characterized by CDBP, Iodine surface area (I2No.), and nitrogen surface area (N2SA), as well as other properties.

Carbon blacks may be utilized as pigments, fillers, reinforcing agents and for a variety of other applications. For example, carbon blacks are widely utilized as fillers and reinforcing pigments in the compounding and preparation of rubber and plastic compounds. More particularly, carbon blacks are effective in the preparation of rubber vulcanizates intended for usage in preparing tires.

It is generally understood that the properties of a carbon black affect the properties of rubber or plastic compounds containing the carbon black. Thus, the properties of a carbon black will affect the properties of tire compounds containing the carbon black.

The sidewall area of passenger, light truck, medium truck, and similar tires has long been the subject of extensive cosmetic attention. Manufacturers, wholesalers, retailers, and consumers in both the tire and automotive industries place value on the visual appearance of the tire sidewall. By way of non-limiting example, tires featuring the traditional white sidewall, raised black letters, raised white letters, dual sidewall stripes, sidewall stripes of colors other than white, and outlined (in white) raised letters have all been "in style" at various times and/or places.

Currently, the simple black sidewall is in style. However, with the carbon blacks and elastomers presently used in tire manufacture, the appearance of the black sidewall is diminished in two ways:

the carbon blacks used are of a very low surface area, semi-reinforcing type, which does not give an attractive appearance as discussed later. The current industry practice is to use carbon blacks having CTAB of less than about 50 m$^2$/g in most cases. The tint of these blacks is, in most cases, about 60% ITRB.

the elastomers used in tire manufacture are traditional, unsaturated elastomers which depend upon antiozonants and antioxidants to protect them from degradation caused by exposure to the elements. These antidegradants "bloom" to the surface to react with the ozone and impart protection to the elastomer(s). Unfortunately, in so doing, these antidegradants turn brown, which in turn further worsens the appearance of the already dull sidewall compound.

Tire buyers combat this by washing their tires frequently, and by applying "tire dressings" of various types. In fact, in North America consumers are currently spending upwards of $80 million per year to enhance the appearance of their tire sidewalls and other vehicle components.

In addition to determining the tire's appearance, the sidewall compound must meet certain performance requirements. The major requirement is good flex fatigue, meaning that the compound must not develop any cracking, checking, splitting, or the like over the life of the tire. Two other commonly-accepted requirements are cutting/chipping resistance, and abrasion resistance, both of which help in resisting damage caused by impacts with curbs and the like. The rigor of these performance requirements varies widely with the type of tire/service that the tire will undergo.

At present, about 41 grades of carbon black are manufactured and used routinely in elastomer applications, and in particular rubber applications such as tire components. Use of these carbon blacks is generally controlled exclusively by functional considerations, i.e., the functional properties which the resulting product is desired or required to possess.

In addition, a range of carbon blacks are made for use in non-elastomer applications such as inks, paints, and plastics. In most of these applications an important function of these specialty carbon blacks is to impart an esthetically pleasing appearance to the finished product, which is often an ink or a paint. Terms such as jetness, undertone (blue or brown), and gloss may be used in describing the characteristics of such products, and characteristics imparted to inks and paints by these products.

It has now unexpectedly been discovered that certain of the specialty blacks products can enhance the appearance of elastomeric compounds, including sidewall compounds, while still satisfying critical functional criteria.

SUMMARY OF THE INVENTION

The present invention is generally directed to carbon black-containing elastomeric compositions which preferably exhibit hi gloss and jetness, combined with desirable physical properties. The compositions comprise an elastomer(s) and a specified carbon black, which is preferably furnace carbon black.

The carbon black component of the rubber composition is a furnace carbon black having an I$_2$No of from about 80, or from about 100, preferably from about 125, more preferably from about 140 mg/g, to about 400, preferably to about 375, and most preferably to about 360 mg/g.

The carbon black may have a DBP value of at least about 50 cc/100 g, a tint value of at least about 100% ITRB, and a CTAB value of at least about 80 m$^2$/g.

The elastomer component of the formulation of the present invention may be any suitable natural or synthetic rubber, or mixtures of these rubbers and their derivatives. The elastomer may be, but is not limited to, homo- or co-polymers of 1,3-butadiene, styrene, isoprene, isobutylene, 2,3-dimethyl-1,3-butadiene, acrylonitrile, ethylene, and propylene, SBR (including solution SBR, functional solution SBR, and/or emulsion SBR), and natural rubber. Rubbers found to have particular utility include natural rubber, butadiene rubber, and blends thereof. Non-saturated rubbers such as halobutyl, styrenated halobutyl, EPDM, and the like are also of interest, as these elastomers may allow a reduction in the use of the "browning" antiozonants/antioxidants as well.

Applications for the elastomeric compositions include, but are not limited to, the above mentioned sidewall area of passenger, light truck, medium/heavy truck tires, airplane, racing, and large "off the road" tires. In these applications, the rubber compositions of the present invention may be used as veneers over the sidewall area or as the entire sidewall compound. In addition, other automotive components may benefit from an improved appearance, including components such as weather-stripping, hoses, windshield wipers, and belts. As in the tire sidewall example, the article may be made entirely from the rubber compositions of the present invention, or the present invention may simply be used as a veneer covering the otherwise exposed surface.

In addition to elastomer compositions used in the tire and automotive areas, the present invention has application to any elastomeric compositions used in environments where a glossy esthetic appearance would be desirable, regardless of the need for the functional properties which may correspondingly be obtained through practice of the present invention. Such applications may include, by way of non-limiting example, construction or building materials, such as moldings; consumer apparel, such as footwear (including without limitation sneakers, boots, and shoes); furniture guards and bumpers; and children's toys and play equipment, such as swing seats.

Hereinafter compositions of the present invention will be discussed and exemplified in terms of rubbers; however, it will be understood that the discussion is not limited to rubbers, and is applicable to elastomers and polymers generally.

The rubber composition of the present invention generally comprises from about 20 to about 200 parts by weight of carbon black for each 100 parts by weight of rubber(s) used. (The quantification of carbon black as parts by weight per 100 parts by weight of rubber is hereinafter abbreviated as "phr"; thus, a composition containing 20 phr carbon black would contain 20 parts by weight carbon black per 100 parts by weight rubber.) It is, however, preferred to use from about 25 to about 125 phr of carbon black, and especially preferred is a composition comprising from about 25 to about 75 phr of carbon black.

The rubber compositions may include conventional additives such as curing agents, processing additives, hydrocarbon oils, accelerators, coagents, antioxidants and the like.

BRIEF DESCRIPTION OF THE DRAWINGS

The FIGURE is a graph showing the tearing energy versus cut growth, demonstrating the flex fatigue for various elastomeric compositions of the present invention and a control.

DETAILED DESCRIPTION OF THE INVENTION

Figure 1:
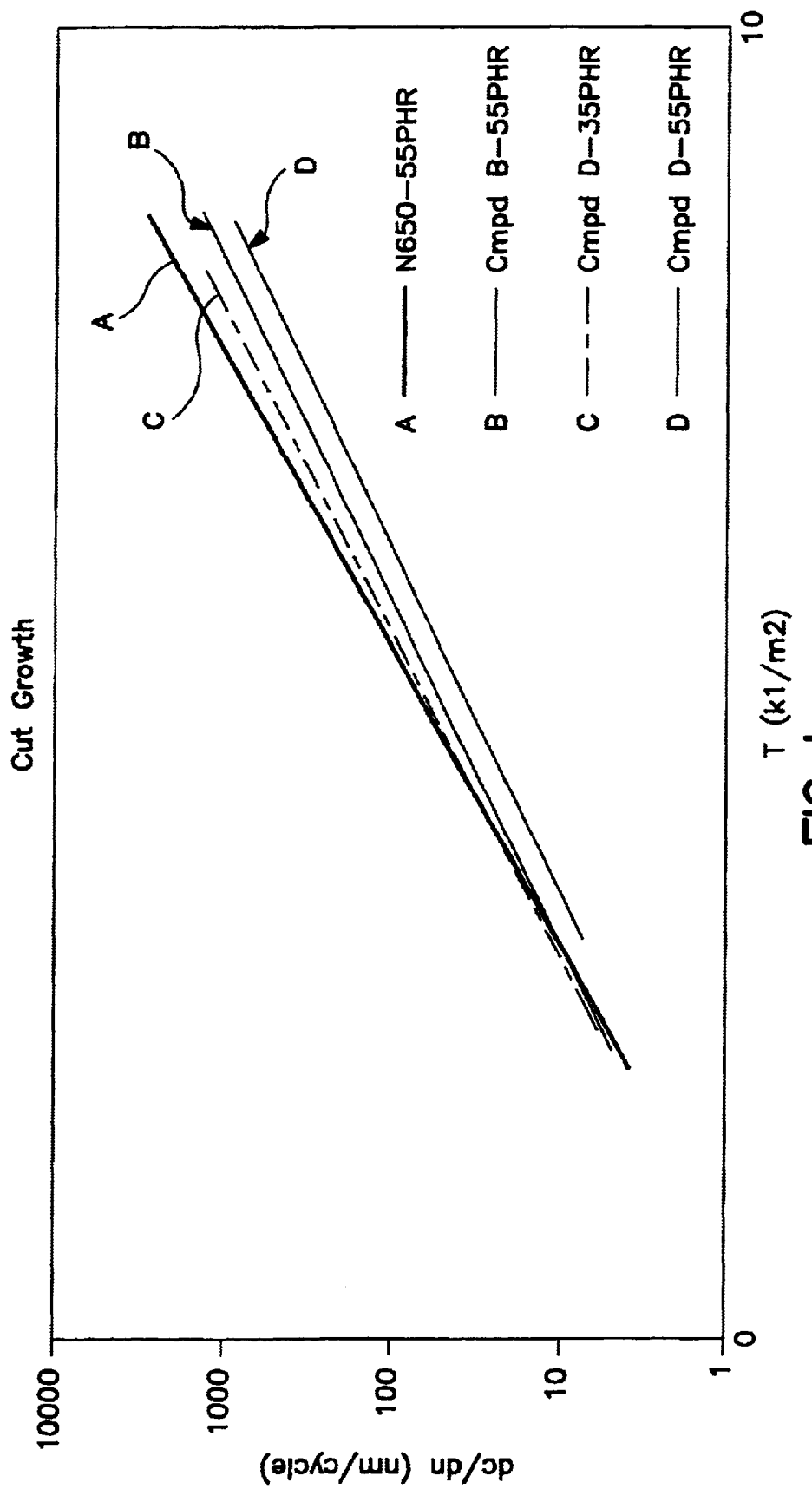

The present invention provides rubber compositions having a combination of improved appearance and desirable physical properties. Preferably, articles or portions thereof contain at least one elastomer and the carbon black of the present invention, wherein the article has a non-abrading surface, such as a sidewall of a tire; a top and/or edge of a shoe or sneaker; a weather strip; a molded part on a automobile like a side mirror frame; and the like. An abrading surface would be, for instance, a tread of a tire or a conveyor belt surface. The carbon blacks of the present invention would be present in at least the non-abrading elastomeric surface to impart a desired level of glass to the surface. The carbon black is selected from one or more of the following characteristics:

The carbon black component of the rubber composition can have an $I_2NO$ of from about 80, or from about 100, preferably from about 125, more preferably from about 140 mg/g, to about 400, preferably to about 375, and most preferably to about 360 mg/g.

The carbon black may have a DBP value of at least about 50 cc/100 g. Preferably, the DBP value is from about 55, more preferably from about 100 cc/100 g, to about 175, preferably to about 160, more preferably to about 150 cc/100 g.

Furthermore, the carbon black may have a tint value of at least about 100% ITRB. Preferably, the tint value is from about 110, more preferably from about 130, even more preferably from about 135% ITRB, to about 175, preferably to about 165, and more preferably to about 160 % ITRB.

The carbon black may additionally have a $N_2SA$ value of from about 80, preferably from about 100, more preferably from about 110, even more preferably from about 120 m$^2$/g, to about 450, preferably to about 400, more preferably to about 385, even more preferably to about 375 m$^2$/g.

Finally, the carbon blacks may have a CTAB value of at least about 80 m$^2$/g. Preferably, the CTAB value is from about 100, more preferably from about 110, and even more preferably from about 120 m$^2$/g, to about 300, preferably to about 275, and more preferably to about 255 m$^2$/g.

As stated above, the carbon black that can be used in the present invention can have one or more of the properties described above. Preferably, the carbon black has a DBP value of at least about 50 cc/100 g, a tint value of at least about 100% ITRB, and a CTAB value of at least about 80 m$^2$/g. More preferably, the carbon black has the DBP value, tint value, and CTAB value described above as well as a $I_2NO$ of from about 80 to about 400 mg/g, and/or a $N_2SA$ value of from about 80 to about 450 m$^2$/g. The carbon black further can have any combination of the various preferred ranges for each of the individual properties described above.

Further, the carbon black is preferably a furnace carbon black but other carbon blacks having the various properties described above can also be used.

Further, other carbon blacks which may not have one or more of the above described properties can be used in addition to the carbon blacks described above. Also, conventional fillers such as silica can also be present in the elastomeric compositions.

The compositions of the present invention which comprise an elastomer and a carbon black described above having one or more of the described properties preferably imparts a higher gloss and/or a lower jetness value to an elastomer formed from the composition especially when compared to an article formed from a composition using N650 carbon black at the same loading level. This gloss improvement is generally at least about 33% greater than the gloss of the same article formed using N650 carbon black at the same loading level. Further, the composition preferably imparts a jetness value of no more than about 10.5 to an article formed from the composition.

The following ASTM test procedures were used to determine the analytical properties of the carbon blacks disclosed herein:

| Property | ASTM Procedure |
| --- | --- |
| $I_2$No. | D-1510 |
| CTAB | D-3765 |
| Tint | D-3265 |
| DBP | D-2414 |
| $N_2$SA | D-3037 |

Table 1 sets forth the analytical properties of the carbon blacks of compounds 1–9. Compounds 2–9 contain furnace carbon blacks of the present invention. Compound 1 contains a conventional furnace carbon black control.

TABLE 1

|  | 1 N650 | 2 A | 3 B | 4 C | 5 D | 6 E | 7 F | 8 G | 9 H |
| --- | --- | --- | --- | --- | --- | --- | --- | --- | --- |
| $I_2$NO | 36 | 82 | 121 | 258 | 258 | 258 | 356 | 125 | 150 |
| DBP | 122 | 102 | 114 | 117 | 105 | 64 | 133 | 60 | 143 |
| Tint | 56 | 103 | 115 | 148 | 153 | 151 | 141 | 138 | 146 |
| CTAB | 38 | 82 | 111 | 167 | 211 | 240 | 251 | 125 | 150 |
| $N_2$SA | 38 | 83 | 119 | 200 | 220 | 230 | 367 | 125 | 150 |

1 = STERLING VH; 2 = VULCAN 3; 3 = VULCAN 6; 4 = BP700; 5 = BP880; 6 = BP900; 7 = CRX1449; 8 = REGAL 660; and 9 = CRX1444, all tradenames of Cabot Corporation.

The effectiveness and advantages of the present invention will be further illustrated by the rubber compositions set forth in compounds 1–9. Table 2 sets forth the formulations of compounds 1–9. In preparing the rubber compositions, the method of mixing the components comprising the rubber composition is not critical. Any conventional method of mixing may be employed. In the present case, the mixing was performed in a Banbury mixer (1575 cc volume) utilizing the following procedure:

STAGE 1:

"BR" Banbury, 77RPM, 32° C. Water, 40PSI Ram

| 0' | Load NR, BR |
| --- | --- |
| 30" | Load Black, Zinc Oxide, Stearic Acid, TMQ, 6PPD, Wax |
| 280° F. | Sweep, Add oil, increase RPM to 115 |
| 300° F. | Dump, Sheet off on mill |

STAGE 2

On 49° C. Mill:
Add MB to mill and band; Add TBBS and sulfur; 6×6 Milling

TABLE 2

| Ingredient | PHR |
| --- | --- |
| Natural Rubber | 40 |
| BR | 60 |
| Carbon Black | *as indicated |
| Naphthenic Oil | *as indicated |
| Zinc Oxide | 5 |
| Stearic Acid | 2 |
| TMQ | 1.5 |
| 6 PPD | 1.5 |
| Wax | 1.5 |
| TBBS | 1.5 |
| Sulfur | 1.25 |

TABLE 2-continued

The following test procedures were used to evaluate the physical properties of the rubber compositions of compounds 1–9:

| Modulus, tensile, and elongation at break | D-412 |
| --- | --- |
| Flex Fatigue-Cut Growth | MERL Mk IV, Sinusoidal mode, tested at 43° C. |
| Abrasion Resistance | Akron Angle Abrader, 20° angle |
| Rebound | D-1054 |
| Gloss | BYK-Gardner Micro TKI Gloss Meter |
| Jetness | Hunter Labscan 6000, 10°, D65 CIELAB Color Space |

Most importantly, gloss was measured on tensile slabs not subjected to water using a BYK-Gardner Micro TKI Gloss meter under light reflecting at a 60° angle. Jetness was measured by the Hunter Labscan 6000, 10 degree, D65 CIELAB Color Space, measuring each compound versus a control sample containing N650 at 55 phr. Each compound was scanned for jetness (L*) five times, and the average reported.

Flex Fatigue-Cut growth was tested using a MERL Mk IV Crack Growth Fatigue Machine under sinusoidal mode at 43° C.+−3° C. with various strains to give varying tearing energies. The test piece is a vulcanized strip of rubber containing a man made incision.

Table 3 sets forth the physical properties of the rubber compositions of selected compounds. The results show that the rubber compositions containing carbon black D, under the present invention, exhibit higher gloss and lower jetness as compared with rubber compositions of compound 1 utilizing the control furnace black ASTM N650. The Table 3 data further shows that the rubber compositions of the present invention may contain lower loadings of carbon black when compared to the compositions utilizing the control ASTM N650 carbon black. The results also indicate that rubber compositions prepared with the furnace carbon blacks of the present invention exhibit critical physical properties such as flex fatigue (crack growth) comparable with those possessed by the compositions containing the control carbon black, N650. The results further indicate that the compositions containing the carbon blacks of the present invention show comparable results in critical properties such as tensile strength and advantages in abrasion resistance. These failure properties can be of particular advantage in rubber articles which come into contact with abrasive or sharp surfaces, such as tire sidewalls. The Figure shows tearing energy versus cut growth, demonstrating the advantage in flex fatigue at all tearing energies for the rubber compositions of the present invention when compared to the control, N650. Last, it is noted that the rubber compositions containing the carbon blacks of the present invention exhibit higher hysteresis (lower rebound), but lower loadings of the carbon blacks of the present invention minimize this apparent deficiency while maintaining a very high level of reinforcement.

TABLE 3

| Carbon Black | CB/oil Loading | 60° Gloss (%) | Jetness (L*) | Tensile Strength (MPa) | Abrasion Resist. (volume loss) | Rebound (% RE) |
|---|---|---|---|---|---|---|
| N650 | 55/22 | 100 | 14.94 | 21.35 | 719 | 76.84 |
| A | 45/14 | 133 | 10.22 | 19.07 | * | 70.45 |
| A | 55/24 | 193 | 10.39 | 19.42 | 260 | 67.04 |
| B | 55/24 | 180 | 9.21 | 20.84 | 160 | 64.79 |
| D | 35/8 | 180 | 9.8 | 17.29 | 288 | 64.97 |
| D | 55/23 | 207 | 5.69 | 21.40 | 172 | 52.47 |
| C | 45/17 | 180 | 6.63 | 23.19 | 168 | 61.10 |
| E | 35/3 | 177 | 6.74 | 17.00 | 504 | 67.32 |
|  |  | (higher is better) | (lower is better) |  | (lower is better) | (higher is better) |

*point not tested

It will be readily appreciated that parameters such as the characteristics of the carbon black (Tint, CTAB, $I_2$No., etc.) and the carbon black loading level can be adjusted to achieve a desired level of gloss or jetness. Thus, it is possible to achieve not only the improvements in gloss and jetness shown by the discrete data points above, but also those within the ranges shown by those points. Therefore, one of ordinary skill in the art can, using the teachings of the present application, obtain articles having gloss in the range of from 1% to over 100% higher than the reference article incorporating N650 carbon black, i.e., 25% higher, 50% higher, 75% higher, 100% higher, and so on. Similarly, it would be possible to obtain articles having jetness over the range of less than 14.94 to less than 6, i.e., less than about 14.5, about 10, less than about 10, less than about 7, less than about 6, and so on.

Finally, as can be seen in Table 4, loading does not affect jetness at low carbon black structure levels(below 100 DBP). Even though the loading increased, no significant change in jetness was exhibited for the blacks and loadings tested. The effect seems to only be prevalent at high structure levels(above 100 DBP). As loading increases the compounds exhibit a blacker color (i.e. lower jetness numbers). For the blacks and loadings tested, loading does not significantly effect gloss at any structure/surface area level.

TABLE 4

| Carbon Black | CB Loading | DBP (structure) | 60° Gloss(%) | Jetness(L*) |
|---|---|---|---|---|
| N650 | 35 | 122 | 87 | 18.94 |
| N650 | 45 | 122 | 87 | 16.79 |
| N650 | 55 | 122 | 100 | 14.94 |
| A | 35 | 102 | 160 | 15.75 |
| A | 45 | 102 | 133 | 10.22 |
| A | 55 | 102 | 193 | 10.39 |
| B | 35 | 114 | 157 | 12.04 |
| B | 45 | 114 | 177 | 10.47 |
| B | 55 | 114 | 180 | 9.21 |
| C | 35 | 117 | 200 | 8.42 |
| C | 45 | 117 | 180 | 6.63 |
| C | 55 | 117 | 200 | 6.89 |
| D | 35 | 105 | 180 | 9.8 |
| D | 45 | 105 | 203 | 7.09 |
| D | 55 | 105 | 207 | 5.69 |
| G | 35 | 60 | 167 | 12.64 |
| G | 45 | 60 | 157 | 13.46 |
| G | 55 | 60 | 160 | 13.36 |
|  |  |  | (higher is better) | (lower is better) |

The present invention has of necessity been discussed herein by reference to certain specific methods and materials. The enumeration of these methods and materials was merely illustrative, and in no way constitutes any limitation on the scope of the present invention. It is to be expected that those skilled in the art may discern and practice variations of or alternatives to the specific teachings provided herein, without departing from the scope of the present invention. In particular, it should be noted that while the present invention is focused on use of the rubber compositions in tire applications, they would also be useful in any application or environment where the combination of esthetic and physical properties noted herein would be desirable.

What is claimed is:

1. An article having a non-abrading surface, wherein at least said surface comprises at least one elastomer and a carbon black having a DBP value of at least about 50 cc/100 g, a Tint value of at least about 100% ITRB, and a CTAB value of at least about 80 $m^2$/g, wherein said non-abrading surface is a sidewall of a tire or a veneer thereof.

2. The article of claim 1, wherein said composition imparts a higher gloss, a lower jetness value, or both to an article formed from said composition relative to an article formed from a composition using N650 carbon black at the same loading level.

3. The article of claim 1, wherein said carbon black is furnace carbon black.

4. The article of claim 2, wherein said carbon black is furnace carbon black.

5. The article as defined by claim 1, whereby said composition imparts gloss to an article formed from said composition which is at least about 33% greater than the gloss of the same article formed using N650 carbon black at the same loading level.

6. The article of claim 1, whereby said composition imparts a jetness value of no more than about 10.5 to an article formed from said composition.

7. The article of claim 1, wherein said DBP value is from about 55 to about 160 cc/100 g.

8. The article of claim 1, wherein said DBP value is from about 100 to about 150 cc/100 g.

9. The article of claim 1, wherein said Tint value is from about 110 to about 175% ITRB.

10. The article of claim 1, wherein said Tint value is from about 120 to about 175% ITRB.

11. The article of claim 1, wherein said Tint value is from about 130 to about 165% ITRB.

12. The article of claim 1, wherein said Tint value is from about 135 to about 160% ITRB.

13. The article of claim 1, wherein said CTAB value is from about 100 to about 300 $m^2$/g.

14. The article of claim 1, wherein said CTAB value is from about 110 to about 275 $m^2$/g.

15. The article of claim 1, wherein said CTAB value is from about 120 to about 255 $m^2$/g.

16. The article of claim 1, wherein said DBP value is from about 50 to about 175 cc/100 g.

17. The article of claim 1, wherein said Tint value is from about 100% ITRB to about 175% ITRB.

18. The article of claim 1, wherein said CTAB value is from about 80 to about 300 $m^2$/g.

19. The article of claim 1, wherein said DBP value is from about 50 to about 175 cc/100 g, said Tint value is from about 100% ITRB to about 175% ITRB, and said CTAB value is from about 80 to about 300 $m^2$/g.

20. The article of claim 1, wherein said DBP value is from about 100 to about 150 cc/100 g, said Tint value is from about 135 to about 160% ITRB, and CTAB value is from about 120 to about 255 $m^2$/g.

21. The article of claim 1, wherein said carbon black has an $I_2$No. of from about 80 to about 400 mg/g.

22. The article of claim 21, wherein said $I_2$No. is from about 100 to about 400 mg/g.

23. The article of claim 21, wherein said $I_2$No. is from about 125 to about 375 mg/g.

24. The article of claim 21, wherein said $I_2$No. is from about 140 to about 360 mg/g.

25. The article of claim 1, wherein said carbon black has a $N_2SA$ value of from about 80 to about 450 m$^2$/g.

26. The article of claim 25, wherein said $N_2SA$ value is from about 110 to about 385 m$^2$/g.

27. The article of claim 25, wherein said $N_2SA$ value is from about 120 to about 375 m$^2$/g.

28. The article of claim 1, wherein said elastomer comprises at least one of homo- or co-polymers of 1,3-butadiene, styrene, isoprene, isobutylene, 2,3-dimethyl-1,3-butadiene, acrylonitrile, ethylene, propylene, SBR, natural rubber, halobutyl, styrenated halobutyl, or EPDM.

29. The article of claim 1, wherein said elastomer is at least one of natural rubber, butadiene rubber, halobutyl rubber, styrenated halobutyl rubber, or EPDM.

30. The article of claim 1, comprising from about 20 to about 200 phr of said carbon black.

31. The article of claim 1, comprising from about 25 to about 125 phr of said carbon black.

32. The article of claim 1, comprising from about 25 to about 75 phr of said carbon black.

33. An article of manufacture prepared from a composition comprising at least one elastomer and a carbon black having a DBP value of at least about 50 cc/100 g, a Tint value of at least about 100% ITRB, and a CTAB value of at least about 80 m$^2$/g, wherein said article of manufacture is a sidewall of a tire or a veneer thereof.

34. The article of manufacture as of claim 33, having a gloss which is at least about 33% greater than the gloss of the same article formed using N650 carbon black at the same loading level.

35. The article of manufacture of claim 34, wherein said gloss is at least about 50% greater than the gloss of the same article formed using N650 carbon black at the same loading level.

36. The article of manufacture of claim 34, wherein said gloss is at least about 70% greater than the gloss of the same article formed using N650 carbon black at the same loading level.

37. The article of manufacture of claim 34, wherein said gloss is at least about 100% greater than the gloss of the same article formed using N650 carbon black at the same loading level.

38. The article of manufacture of claim 33, having a jetness value of no more than about 10.5.

39. The article of manufacture of claim 33, having a jetness value of no more than about 10.

40. The article of manufacture of claim 33, having a jetness value of no more than about 7.

41. The article of manufacture of claim 33, having a jetness value of no more than about 6.75.

42. A process for making a rubber article having a non-abrading surface, said process comprising the step of forming at least a portion of said non-abrading surface of said rubber article from a composition comprising an elastomer and a furnace carbon black having a DBP value of at least about 50 cc/100 g, a Tint value of at least about 100% ITRB, and a CTAB value of at least about 80 m$^2$/g, whereby said article exhibits higher gloss and/or a lower jetness value relative to an article formed from a composition using N650 carbon black at the same loading level, wherein said non-abrading face is a sidewall of a tire or a veneer thereof.

43. The process of claim 42, whereby said article exhibits gloss which is at least about 33% greater than the gloss of the same article formed using N650 carbon black at the same loading level.

44. The process of claim 42, whereby said article exhibits a jetness value of no more than about 10.5.

45. The process of claim 42, further comprising providing said composition as a layer over at least a portion of the surface of said rubber article.

46. The process of claim 42, further comprising providing said composition as a layer over substantially all of the surface of said rubber article.

47. The process of claim 42, wherein substantially all of said article is formed from said composition.

48. An article formed by the process as defined by claim 42.

* * * * *